United States Patent
Accapadi et al.

(10) Patent No.: US 8,775,749 B2
(45) Date of Patent: *Jul. 8, 2014

(54) DEMAND BASED MEMORY MANAGEMENT OF NON-PAGABLE DATA STORAGE

(71) Applicants: Mathew Accapadi, Austin, TX (US); Grover C. Davidson, II, Round Rock, TX (US); Dirk Michel, Austin, TX (US); Bret R. Olszewski, Austin, TX (US)

(72) Inventors: Mathew Accapadi, Austin, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,193

(22) Filed: Jun. 26, 2013

(65) Prior Publication Data

US 2013/0290666 A1    Oct. 31, 2013

Related U.S. Application Data

(63) Continuation of application No. 12/827,063, filed on Jun. 30, 2010, now Pat. No. 8,499,138.

(51) Int. Cl.
*G06F 13/00* (2006.01)
(52) U.S. Cl.
USPC .......................................... 711/154; 711/171
(58) Field of Classification Search
USPC ................................. 711/154, 171
See application file for complete search history.

(56) References Cited

U.S. PATENT DOCUMENTS

| | | | |
|---|---|---|---|
| 6,922,765 | B2 | 7/2005 | Jacobs |
| 7,089,293 | B2 | 8/2006 | Grosner et al. |
| 7,103,746 | B1 | 9/2006 | Kulick |
| 7,251,671 | B2 | 7/2007 | Wu et al. |
| 7,313,614 | B2 | 12/2007 | Considine et al. |
| 7,958,199 | B2 | 6/2011 | Ferrari et al. |
| 2002/0078066 | A1 | 6/2002 | Robinson et al. |
| 2002/0078239 | A1 | 6/2002 | Howard et al. |
| 2002/0078244 | A1 | 6/2002 | Howard |
| 2007/0136402 | A1 | 6/2007 | Grose et al. |
| 2012/0005448 | A1 | 1/2012 | Accapadi et al. |

OTHER PUBLICATIONS

Jones Tim; "Anatomy of the Linux file system"; Retrieved on Apr. 2, 2010 from http://www.ibm.com/developerworks/linux/library/1-linux-filesytems/.
Wikipedia; "Inode"; Retrieved on Apr. 2, 2010 from http://en.wikipedia.org/wiki/1-node.

(Continued)

*Primary Examiner* — Reba I Elmore
(74) *Attorney, Agent, or Firm* — Robert H. Frantz; David A. Mims, Jr.

(57) ABSTRACT

Management of a UNIX-style storage pools is enhanced by specially managing one or more memory management inodes associated with pinned and allocated pages of data storage by providing indirect access to the pinned and allocated pages by one or more user processes via a handle, while preventing direct access of the pinned and allocated pages by the user processes without use of the handles; scanning periodically hardware status bits in the inodes to determine which of the pinned and allocated pages have been recently accessed within a pre-determined period of time; requesting via a call-back communication to each user process to determine which of the least-recently accessed pinned and allocated pages can be either deallocated or defragmented and compacted; and responsive to receiving one or more page indicators of pages unpinned by the user processes, compacting or deallocating one or more pages corresponding to the page indicators.

18 Claims, 6 Drawing Sheets

(56) References Cited

OTHER PUBLICATIONS

Linfo; "Inode Definition"; Retrieved on Apr. 2, 2010 from http://www.linfo.org/indoe.html.
Wikipedia; "Inode pointer structure"; Retrieved on Apr. 2, 2010 from http://en.wikipedia.org/wiki/Inode_pointer_structure.
About.Com; "LRU"; Retrieved on Apr. 2, 2010 from http://linuxabout.com/linux101/g/lru.htm.
Herber, J. Randolph; "UNIX System V (Concepts)"; Retrieved on Apr. 2, 2010 from http://www-cdffnal.gov/offline/UNIX_Concepts/concepts.memory.txt.
Goetz, Brian; "Java theory and practice: Garbage collection and performance"; Retrieved on Apr. 19, 2010 from http://www.ibm.com/developworks/library/j-jtp01274.html.
McKusick, Marshall; "AFast File System for UNIX" Retrieved on Apr. 2, 2010 from http://www.cs.berkeley.edu/-brewer/cs262/FFS.pdf.
TLDP; "Chapter Nine the File system"; Retrieved on Apr. 19, 2010 from http://tldp.org/LDP/tlk/fs/filesystem.html.
Burleson, Don;"Oracle Stored Procedures Tips" Retrieved on Apr. 2, 2010 from http:www.dba-oracle.com/art_proc.htm.
Stackoverflow; " Why is LRU better than FIFO?"; Retrieved on Apr. 2, 2010 from http://stackoverflow.com/questions/2058403/why-is-lru-better-than-fifo.
Howstuffworks; Pointers to Pointers; retrieved from http://computer.howstuffworkers.com/c32.htm on Aug. 6, 2012.
Mindprod; "Java Glossary"; retrieved from http://mindprod.com/jgloss/pointer.html on Aug. 6, 2012.
Stackoverflow; "Pointer vs Handles in C"; retrieved from http://stackoverflow.com/questions/1923599/pointer-vs-handles-in-c-are-the-terms-used-to-convery-separate-things on Aug. 6, 2012.

Fig.1

*Prior Art*

DEMAND BASED MEMORY MANAGEMENT OF NON-PAGABLE DATA STORAGE

CROSS-REFERENCE TO RELATED APPLICATIONS

Claiming Benefit Under 35 U.S.C. 120

This is a continuation application of U.S. patent application 12/827,063, filed on Jun. 30, 2010, by Mathey Accapadi, et al., which is now under notice of allowance.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

FIELD OF THE INVENTION

The invention generally to systems and computerized methods to manage open customer complaint and trouble tickets in the customer service and customer relationship management fields. This is a continuation application of U.S. patent application Ser. No. 12/827,063, filed on Jun. 30, 2010, by Mathey Accapadi, et al., which is now under notice of allowance.

BACKGROUND OF INVENTION

In typical computing platform operating systems, pools of data storage (hereinafter "storage") exist that are managed by subsystems. of the computing platform, many of which are software programs or modules being executed by the processor of the computing platform, but some of which may be hardware-based or circuit-based memory management functions, as well.

In particular, UNIX™ and "UNIX-like" operating systems, including but not limited to International Business Machine Corporation's AIX™, Apple's Max OS-X™, SCO-UNIX™, Hewlett-Packard's HP-UX™, Sun Microsystem's Solarix™, and Linux™. UNIX was originally developed by Bell Laboratories of American Telephone and Telegraph (AT&T), and has become a virtual standard from which many operating systems have emulated operational functionality, some of which are based on derivative development, and others of which are only based on similar operating system concepts. We will refer to these types of operating systems (OS) collectively in the present disclosure, unless specific notation is made to an embodiment or problem relative to a particular variant of operating system.

The i-node storage pool is well-known in operating system technologies as a range of virtual addresses managed by a file system of the operating system. The range of addresses is split into a set of distinct subpieces, the i-node structures themselves. The management of this structure has the following properties:

(a) The objects themselves (the i-nodes) are typically smaller than the page size of the operating system, typically 256-512 kb is managed by a single i-node.

(b) The i-node objects are accessed in a variety of ways, so they must be "pinned" in memory. Thus, they cannot be managed by normal virtual memory management paging functions of the OS.

(c) The range of addresses is known and normally limited to some range of memory. For example, in AIX™, this range can be up to 40% of physical memory, where "physical memory" is a well-known term in computing to refer to the storage capacity of the actual electronic computer readable memory devices associated with a computing platform, such as the total amount of random access memory (RAM) and disk space of a particular computer.

SUMMARY OF THE EXEMPLARY

Embodiments of the Invention

Management of a UNIX-style storage pools is enhanced by specially managing one or more memory management inodes associated with pinned and allocated pages of data storage by providing indirect access to the pinned and allocated pages by one or more user processes via a handle, while preventing direct access of the pinned and allocated pages by the user processes without use of the handles; scanning periodically hardware status bits in the inodes to determine which of the pinned and allocated pages have been recently accessed within a pre-determined period of time; requesting via a call-back communication to each user process to determine which of the least-recently accessed pinned and allocated pages can be either deallocated or defragmented and compacted; and responsive to receiving one or more page indicators of pages unpinned by the user processes, compacting or deallocating one or more pages corresponding to the page indicators.

BRIEF DESCRIPTION OF THE DRAWINGS

The description set forth herein is illustrated by the several drawings.

DETAILED DESCRIPTION OF EMBODIMENT(S) OF THE INVENTION

Today's memory management mechanisms allow the storage pool of operating systems ("OS's") to grow up to the maximum allowable addressable range of physical memory, based upon memory use by computer programs, modules, device drivers, and operating system functions (e.g. subsystems).

The inventors of the present invention have recognized that UNIX™ and Unix-like provide no mechanism to take into account pressure on memory in managing the storage pool. The inventors of the present invention have realized that this creates a problem wherein a large fraction of physical and virtual memory can be consumed with this storage pool, regardless of whether or not the system is paging. Additionally, the amount of memory consumed can cause issues with external management agents, such as a load-leveler. Having recognized this problem not addressed in the art, the present invention is especially useful for improved management of UNIX and UNIX-like storage i-node pools. However, management of other types of storage pools may also benefit from this invention, as well.

Anatomy of an I-Node

Figure 2:
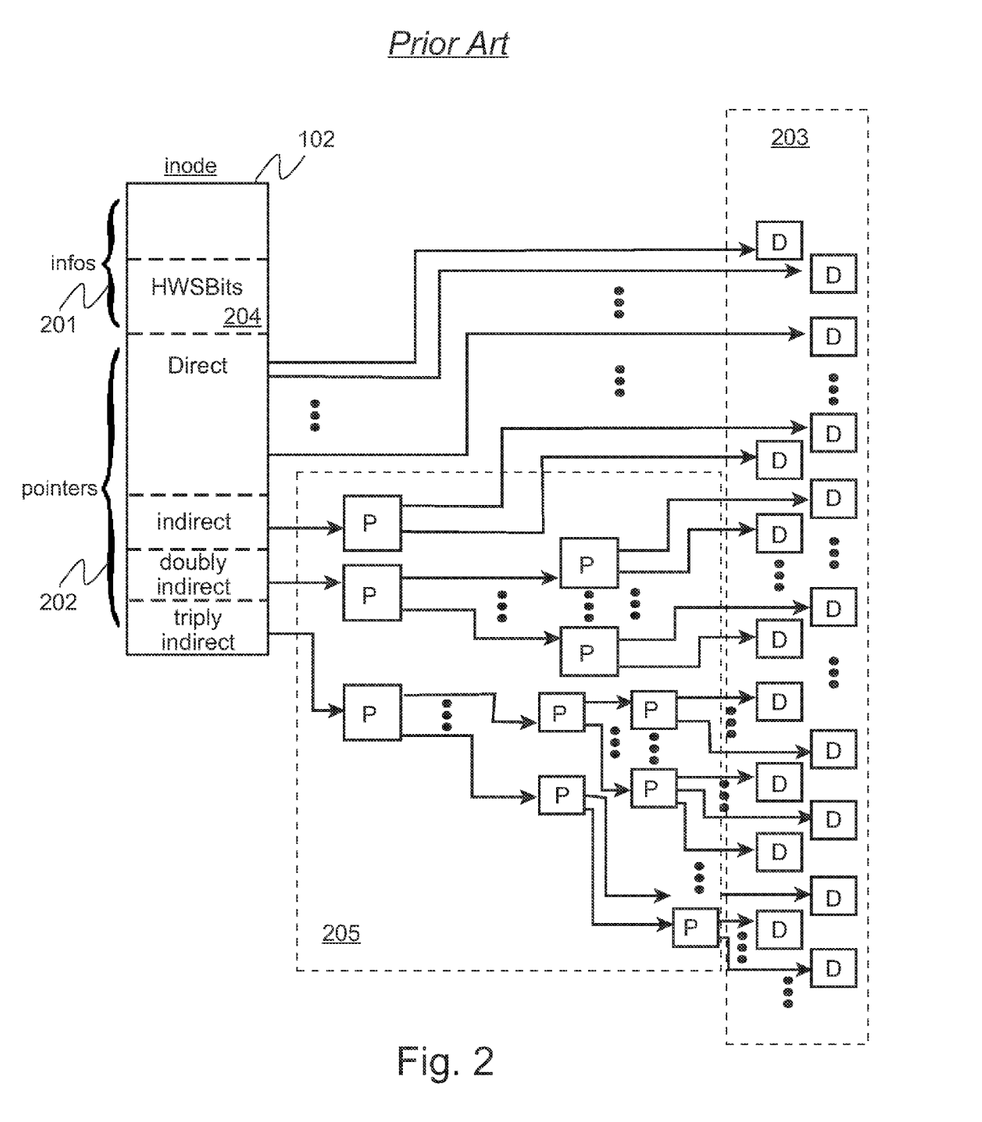
FIG. 2 illustrates the anatomy of a typical i-node of an operating system.

Referring to FIG. 2, the anatomy of a typical i-node (102) of an operating system is shown, including an "infos" portion (201) and a pointers portion (202). In the infos portion, certain information regarding the ownership, creation and management of the data blocks (203) controlled by the i-node is contained. In particular, the "hardware status bits" (HWS-Bits) (204) provide a bitmap of which data blocks are allocated or de-allocated, and which data blocks have been recently accessed and which are stale.

In the pointers section, a set of direct pointers point to actual data blocks, while a set of indirect pointers point to another set of pointers which then point to data blocks. Similarly, the doubly indirect pointers point to a set of pointers which still yet point to another set of pointers which lead to data blocks. And, the triply indirect pointers lead to data blocks through three additional sets of pointers. In this manner, an i-node may control a large number of data blocks, some more directly than others.

Logical Processes of Exemplary Embodiments

The following logical processes will be described as logical processes performed by a computer under the execution control of one or more software programs. However, it will be readily recognized that such logical processes may also be realized, in part or whole, in circuitry, such as in a custom memory management circuit. The following example embodiments, therefore, are provided to illustrate possible realizations according to the invention, but not to establish the limits of the scope of the present invention.

Since the operating systems of the type discussed herein already have a well-known solution for handling memory pressure, the inventors have developed a new mechanism which engages and cooperates with these existing mechanisms in the management of this (and possibly other) storage pool(s). In order to do this, a number of changes, additions, and improvements should be made.

Figure 1:
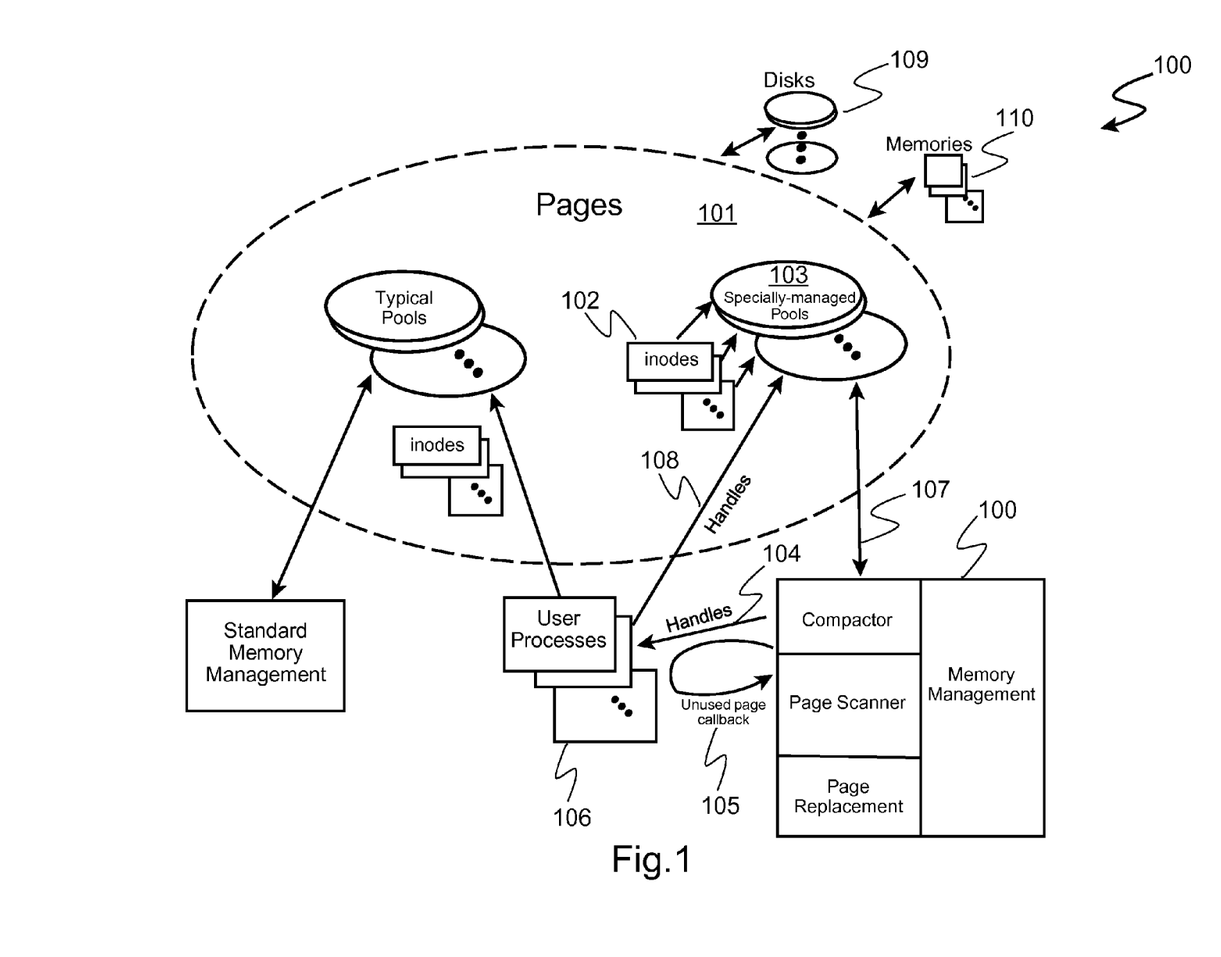
FIG. 1 illustrates allowing standard memory management of typical pools and i-nodes to continue to execute or be performed on a computing platform with the addition of a new memory management function to manage a set of specially-managed pools and i-nodes.

Turning to FIG. 1, please note that the invention envisions allowing standard memory management of typical pools and i-nodes to continue to execute or be performed on a computing platform (120), with the addition of a new memory management function (100) to manage a set of specially-managed pools (103) and i-nodes (102), thereby managing all pages (101) in one manner or another.

First, the management of this pool's pages is performed in a way different than typical memory management for these types of OS's. Second, because the usage of that memory can be sparse, a mechanism is provided that allows compaction of the structures. The simplest way to enable this is to ensure that the direct address of the structure is not allowed or used, but rather, a handle (104, 108) is supplied to users processes ("users") (106) of the specially managed i-node structures that provides a means of indirection in accessing the i-node data itself. While similar techniques have been applied in operating systems to enable Non-Uniform Memory Access (NUMA) locality optimizations, it has not been applied to i-node management as we have done in the present invention embodiment.

Third, a callback mechanism (105) is supplied by the subsystem that manages the pool. This callback mechanism allows the page-replacement mechanism to call the subsystem to request that it determine if the page contains unused i-nodes, or to determine if a small subset of the page contains active i-nodes but the page can be profitably de-fragmented.

Fourth, the management of this pool scans (107) the specially-managed pool for candidate pages on a different interval than typical page scanning as performed by the normal UNIX memory manager. This makes sense because the rate of change to i-node usage is typically not that high. The higher rate of scanning by embodiments according to the invention is controlled by the following factors:

(a) The amount of memory consumed with this pool. If it is small compared to system member, it is not profitable to scan it often.
(b) The rate of file opens and closes. If open and close is occurring frequently, it can indicate that state is changing in the pool often.

Fifth, the new page replacement mechanism according to the invention scans pages checking a the i-node hardware status bits to indicate which pages have been recently accessed. If a page in the pool hasn't been accessed for a while, the page-replacement mechanism calls the new managing subsystem to ask if the page can be released. If the page contains no allocated i-nodes, the subsystem will indicate that the page can be released. If the page has a small number of allocated i-nodes compared to the size of the page and space is available in other pages, the data block is reallocated and the handles are updated. In some embodiments, serialization might be required for defragmentation.

If it is not profitable for the page to be released, perhaps because there are too many allocated i-nodes in it, then a status is returned to the page replacement mechanism indicating that. At that point, the page replacement mechanism may set the reference bit for that page to recently referenced, to reduce the probability it will be considered as a candidate from replacement again soon.

Since page replacement doesn't typically executed on the pages in this pool, it is a further optimization to give the filesystem a mechanism to clear the reference bit when one or more i-nodes in that page become inactive.

Sixth, the overlying memory management mechanism supports breaking pages if multiple page sizes are supported by the OS. De-allocated pages have their virtual address mappings removed and the count of used memory does not include them.

It should be noted that the present invention provides the following differences as compared to well-known Java™ garbage collection:

(a) Embodiments according to the invention are operative on the hardware support for page replacement using the i-node hardware status bits.
(b) Embodiments according to the invention are do not directly rely on reference counts to determine that storage is used or not used, but rather, such embodiments are operative on information regarding page-sized structures, their creation, deletion, and resource consumption.

Figure 3:
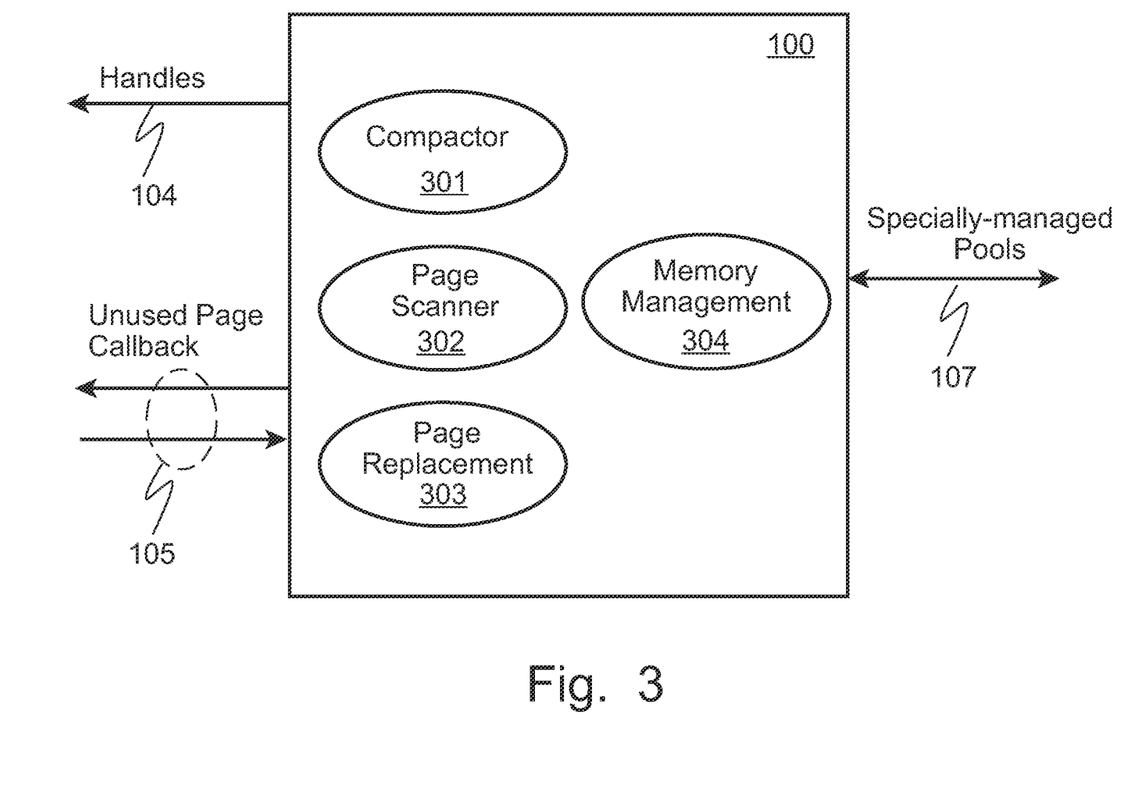
FIG. 3 depicts a functional organization of an embodiment of a new memory manager according to the invention.

Turning to FIG. 3, a functional organization of an embodiment of a new memory manager (100) according to the invention is shown, having a memory management component (304), a compactor component (301), a page scanner component (302) and a page replacement component (303).

Figure 4:
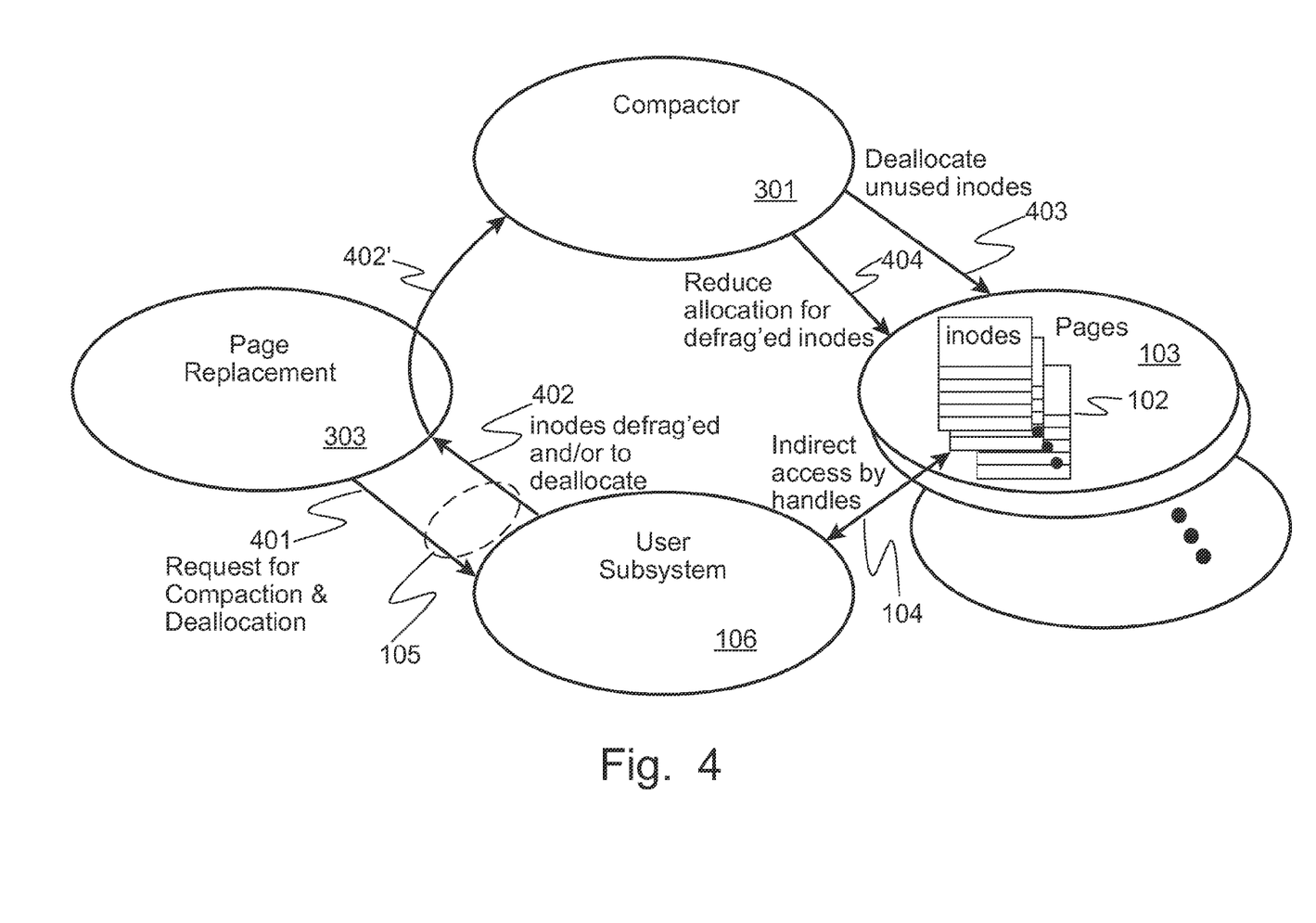
FIG. 4 shows an example embodiment of a page replacement component requesting a user process to determine for itself if any of it's pages can be de-allocated or compacted, and if so, forwarding indications of such pages to a compactor component.

In FIG. 4, the page replacement component may request (401) a user process (106) to determine for itself if any of it's pages can be de-allocated or compacted. The user process determines for itself if any pages can be de-allocated, and if so, returns an indication of those de-allocated pages (402) to the page replacement component. Likewise, if any pages are eligible to be defragmented, a return indication (402) is provided from the user process to the page replacement component.

Those page indications (402) are forwarded (402') to the compactor component (301), which then performs deallocation (403), reduction of allocation for defragmented pages (404), or a combination of deallocation and allocation reduction, on the specially-managed pages (103) and i-nodes (102).

Figure 5:
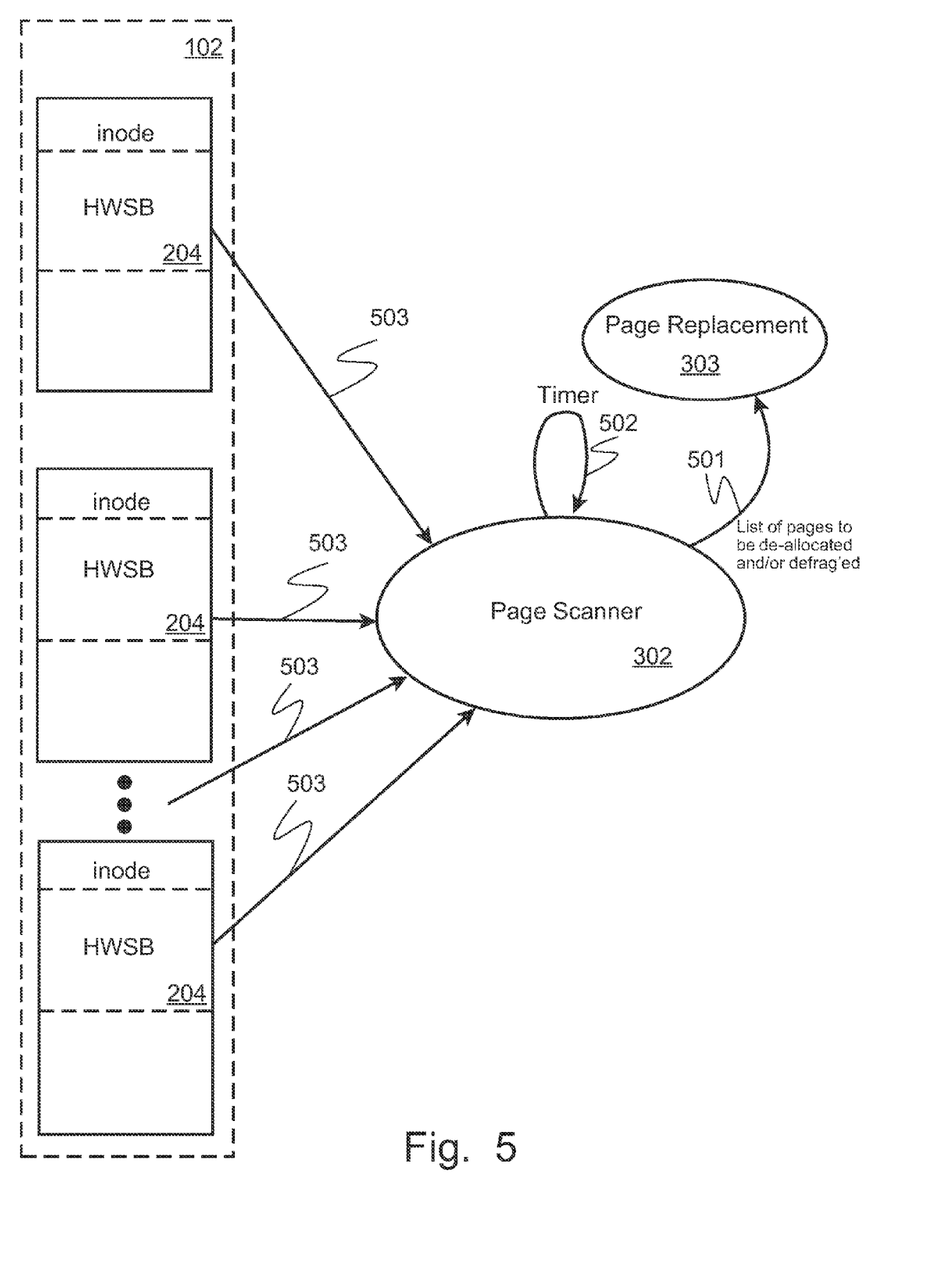
FIG. 5 sets forth details of an example embodiment of a page scanner component.

In FIG. 5, more details of an example embodiment of a page scanner component (302) are shown, in which the page scanner periodically (502) accesses (503) the hardware status bits (204) of the specially-managed i-nodes (102) to determine which pages have been recently accessed, and those which have not, are determined to be candidates for possible deallocation and/or compaction. The list of candidate pages (501) is passed from the page scanner component to the page replacement component for further action as shown in FIG. 4.

Figure 6:
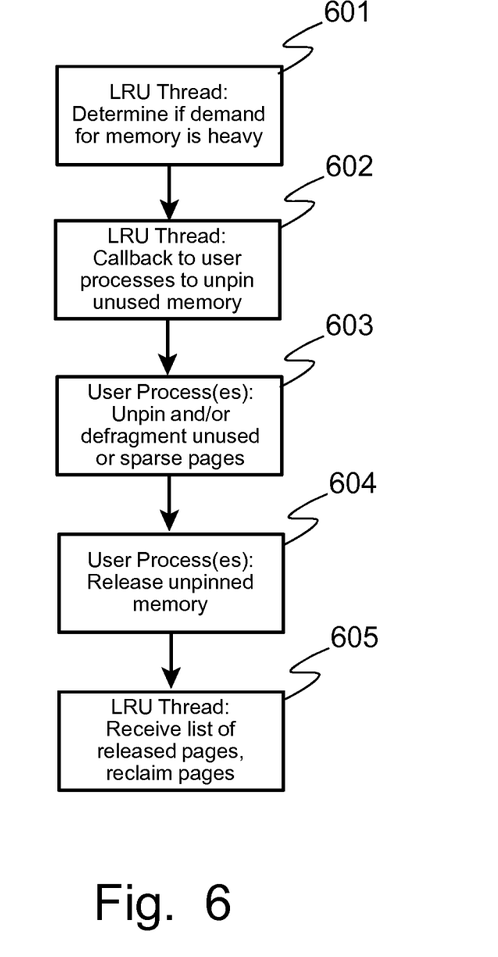
FIG. 6 illustrates an example embodiment of a logical process of an according to the present invention.

Turning to FIG. 6, the logical process of an embodiment of the invention is shown for memory management of a storage pool consisting of a range of virtual addresses managed by a file system. A kernel thread called Least Recently Used (LRU) determines (601) if there is heavy demand for memory, and if so, LRU signals (602) the cooperative user component(s) to compress and unpin memory if possible. The user components then perform internal actions to release and unpin (603) memory it had pinned, followed by signaling back (604) to LRU to reclaim (605) the released memory.

Without the process of the invention, pinned memory is never reclaimed because there is no way to signal a component to release pinned memory in a UNIX or UNIX-like operating system. A novelty of the present invention is having the LRU and components that pin memory work together to release pinned memory thereby allowing those memory pages to be reclaimed by LRU immediately. This increases overall system performance by freeing up previously pinned but unused pages rather than paging out in-use pages.

Computer Program Product

As will be appreciated by one skilled in the art, aspects of the present invention may be embodied as a system, method or computer program product. Accordingly, aspects of the present invention may take the form of an entirely hardware embodiment, potentially employing customized integrated circuits, or an embodiment combining software (software, modules, instances, firmware, resident software, micro-code, etc.) with suitable logical process executing hardware (microprocessor, programmable logic devices, etc.).

Furthermore, aspects of the present invention may take the form of a computer program product embodied in one or more computer readable memories having computer readable program code embodied or encoded thereon or therein.

Any combination of one or more computer readable memories may be utilized, such as Random Access Memory (RAM), Read-Only Memory (ROM), hard disk, optical disk, removable memory, and floppy disks. In the context of this document, a computer readable storage memory may be any tangible medium that can contain, or store a program for use by or in connection with an instruction execution system, apparatus, or device.

Computer program code for carrying out operations for aspects of the present invention may be written in any combination of one or more programming languages, including, but not limited to, an object oriented programming language such as Java™, Smalltalk™, C++™ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions executed by a microprocessor, or alternatively, as a part or entirety of a customized integrated circuit. These computer program instructions may be provided to a processor of a or other programmable data processing apparatus to produce a machine, such that the instructions, which execute via the processor of the computer or other programmable data processing apparatus, create a tangible means for implementing the functions/acts specified in the flowchart and/or block diagram block or blocks.

These computer program instructions may also be stored in a computer readable memory that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The several figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Regarding computers for executing the logical processes set forth herein, it will be readily recognized by those skilled in the art that a variety of computers are suitable and will become suitable as memory, processing, and communications capacities of computers and portable devices increases. Common and well-known computing platforms such as "Personal Computers", web servers such as an IBM iSeries server, and portable devices such as personal digital assistants and smart phones, running a popular operating systems such as Microsoft™ Windows™ or IBM™ AIX™, Palm OS™, Microsoft Windows Mobile™, UNIX, LINUX, Google Android™, Apple iPhone™ operating system, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for memory management of a storage pool consisting of a range of virtual addresses managed by a file system of a computing platform comprising:

a tangible, computer readable storage memory device excluding a propagating signal;

program code embodied by the tangible, computer readable storage memory device for causing a computer processor, when executed, to perform operations comprising:

manage a memory storage pool consisting of a range of virtual addresses associated with allocated pages of data storage by providing indirect access to the allocated pages by one or more user processes via a handle;

scan hardware status bits to determine which of the allocated pages have been accessed within a pre-determined period of time;

request to at least one user process of at least one of the allocated pages to determine if at least one accessed allocated page can be managed by one or more memory management actions selected from the group consisting of deallocation, defragmentation and compacting; and responsive to receiving from the user process and indicator of at least one page to manage, perform the one or more memory management actions.

2. The computer program product as set forth in claim 1 wherein the program code to request further comprises program code to modify the hardware status bits for pages which were least recently used but which were not indicated by a user process as being unpinned or defragmented to reflect more recent use, wherein subsequent callback communications regarding unpinning the pages is delayed.

3. The computer program product as set forth in claim 1 wherein the program code to scan is controlled by a threshold of amount of memory consumed by the pages, wherein responsive to the amount being less than the threshold, scanning is slowed, and wherein responsive to the amount be greater than the threshold, scanning is accelerated.

4. The computer program product as set forth in claim 1 wherein the program code to scan is controlled by a threshold of rate of file open and close operations, wherein responsive to the rate being less than the threshold, scanning is slowed, and wherein responsive to the rate be greater than the threshold, scanning is accelerated.

5. The computer program product as set forth in claim 1 further comprising program code to break pages responsive to multiple page sizes being supported by an operating system component of the computing platform, wherein de-allocated pages have their virtual address mappings removed and a count of used memory is reduced to not include them, and wherein the fifth program code is stored by the tangible, computer readable storage memory device.

6. The computer program product as set forth in claim 1 wherein the program codes avoid utilization of reference counts of an operating system memory management subsystem.

7. A method for memory management of a storage pool consisting of a range of virtual addresses managed by a file system of a computing platform comprising:

managing by a processor a memory storage pool consisting of a range of virtual addresses associated with allocated pages of data storage by providing indirect access to the allocated pages by one or more user processes via a handle;

scanning by the processor hardware status bits to determine which of the allocated pages have been accessed within a pre-determined period of time;

requesting by the processor to at least one user process of at least one of the allocated pages to determine if at least one accessed allocated page can be managed by one or more memory management actions selected from the group consisting of deallocation, defragmentation and compacting; and responsive to receiving from the user process and indicator of at least one page to manage, performing by the processor the one or more memory management actions.

8. The method as set forth in claim 7 further comprising modifying by the processor the hardware status bits for pages which were least recently used but which were not indicated by a user process as being unpinned or defragmented to reflect more recent use, wherein subsequent callback communications regarding unpinning the pages is delayed.

9. The method as set forth in claim 7 wherein the scanning is controlled by a threshold of amount of memory consumed by the pages, wherein responsive to the amount being less than the threshold, scanning is slowed, and wherein responsive to the amount be greater than the threshold, scanning is accelerated.

10. The method as set forth in claim 7 wherein the scanning is controlled by a threshold of rate of file open and close operations, wherein responsive to the rate being less than the threshold, scanning is slowed, and wherein responsive to the rate be greater than the threshold, scanning is accelerated.

11. The method as set forth in claim 7 further comprising breaking by the processor pages responsive to multiple page sizes being supported by an operating system component of the computing platform, wherein de-allocated pages have their virtual address mappings removed and a count of used memory is reduced to not include them.

12. The method as set forth in claim 7 wherein utilization of reference counts of an operating system memory management subsystem is avoided.

13. A system for memory management of a storage pool consisting of a range of virtual addresses managed by a file system of a computing platform comprising:

a computing platform having a processor and a computer readable storage medium having program code embodied therewith, the program code executable by a processor to:

manage by a processor a memory storage pool consisting of a range of virtual addresses associated with allocated pages of data storage by providing indirect access to the allocated pages by one or more user processes via a handle;

scan by the processor hardware status bits to determine which of the allocated pages have been accessed within a pre-determined period of time;

request by the processor to at least one user process of at least one of the allocated pages to determine if at least one accessed allocated page can be managed by one or more memory management actions selected from the group consisting of deallocation, defragmentation and compacting; and responsive to receiving from the user process and indicator of at least one page to manage, perform by the processor the one or more memory management actions.

14. The system as set forth in claim 13 wherein the program code further comprises program code for modifying the hardware status bits for pages which were least recently used but which were not indicated by a user process as being unpinned or defragmented to reflect more recent use, wherein subsequent callback communications regarding unpinning the pages is delayed.

15. The system as set forth in claim 13 wherein the program code for scanning by a threshold of amount of memory consumed by the pages, wherein responsive to the amount being less than the threshold, scanning is slowed, and wherein responsive to the amount be greater than the threshold, scanning is accelerated.

16. The system as set forth in claim 13 wherein the program code for scanning is controlled by a threshold of rate of file open and close operations, wherein responsive to the rate being less than the threshold, scanning is slowed, and wherein responsive to the rate be greater than the threshold, scanning is accelerated.

17. The system as set forth in claim 13 wherein the program code further comprises program code for breaking pages responsive to multiple page sizes being supported by an operating system component of the computing platform, wherein de-allocated pages have their virtual address mappings removed and a count of used memory is reduced to not include them.

18. The system as set forth in claim 13 wherein utilization of reference counts of an operating system memory management subsystem by the a manager, scanner, callback mechanism, or compactor is avoided.

* * * * *